(12) United States Patent
Sugawara

(10) Patent No.: US 7,116,035 B2
(45) Date of Patent: Oct. 3, 2006

(54) SOUND/VIBRATION RESONANCE SEPARATING DEVICE

(75) Inventor: Yo Sugawara, 5-28, 5-Chome, 2-Jo, Nishi-Ku Yamanote, Sapporo, Hokkaido (JP)

(73) Assignee: Yo Sugawara, Hokkaido (JP)

( * ) Notice: Subject to any disclaimer, the term of this patent is extended or adjusted under 35 U.S.C. 154(b) by 116 days.

(21) Appl. No.: 10/502,550

(22) PCT Filed: Feb. 1, 2002

(86) PCT No.: PCT/JP02/00860

§ 371 (c)(1),
(2), (4) Date: Jul. 23, 2004

(87) PCT Pub. No.: WO03/064982

PCT Pub. Date: Aug. 7, 2003

(65) Prior Publication Data

US 2005/0146396 A1     Jul. 7, 2005

(51) Int. Cl.
*H01L 41/08* (2006.01)

(52) U.S. Cl. .............. 310/322; 310/319; 310/321; 310/334

(58) Field of Classification Search ............... 310/322, 310/330–332, 367, 316.01
See application file for complete search history.

(56) References Cited

U.S. PATENT DOCUMENTS 4,507,705 A    3/1985  Hoshino et al.
5,856,722 A *  1/1999  Haronian et al. ........... 310/321
6,012,334 A *  1/2000  Ando et al. .................. 73/651

FOREIGN PATENT DOCUMENTS

| JP | 59-038621 | 3/1984 |
| JP | 10-325753 | 8/1988 |
| JP | 2000-131135 | 2/2000 |
| JP | 2000-201391 | 7/2000 |
| JP | 2000-205940 | 7/2000 |

* cited by examiner

*Primary Examiner*—Mark Budd
(74) *Attorney, Agent, or Firm*—Michael A. Glenn; Glenn Patent Group

(57) ABSTRACT

A sound/vibration resonance separating device for resonance-separating and instantly visualizing sound and vibration having one of various frequencies by fixing vibrators such as a plurality of piano wires to a rigid body. In other words, the device is an auditory model for executing Fourier transform instantly. In FIG. 2, numerals 1–20 designate vibrators having various natural vibrations. When a sound is inputted from a microphone for converting it into an electric signal to a device body, as shown in FIG. 4, the electric signal is amplified/controlled by an electronic circuit (28) and outputted to a speaker (24) acting as a vibration converting device, and the sound becomes amplified longitudinal vibration to vibrate a rigid body (21) longitudinally. The vibration is transmitted to the vibrators (1–20) fixed to the rigid body and having the natural vibration, and only the vibrator corresponding to the frequency vibrates. A volume knob (25) is provided for adjusting the amplitude of the vibration. A frequency control knob is for controlling the vibration frequency of sine wave.

3 Claims, 4 Drawing Sheets

SOUND/VIBRATION RESONANCE SEPARATING DEVICE

Figure 1

| The length of the piano gland and the predicted value with frequency | | | | | | | |
|---|---|---|---|---|---|---|---|
| ①0.3mm | | ②0.5mm | | ③1.0mm | | ④0.3mm scale data | |
| f Hz | length mm | f Hz | length mm | f Hz | length mm | f Hz | length mm |
| 1 | 185 33.1 | 185 | 46.8 | 185 | 53.9 | 246.9 | 28.6 H |
| 2 | 190 32.7 | 190 | 46.1 | 190 | 53.2 | 261.6 | 27.8 C |
| 3 | 195 32.3 | 195 | 45.6 | 195 | 52.5 | 277.2 | 26.9 Des |
| 4 | 200 31.8 | 200 | 45.0 | 200 | 51.8 | 293.7 | 26.2 D |
| 5 | 205 31.4 | 205 | 44.4 | 205 | 51.2 | 311.1 | 25.4 Es |
| 6 | 210 31.1 | 210 | 43.9 | 210 | 50.5 | 329.6 | 24.7 E |
| 7 | 215 30.7 | 215 | 43.4 | 215 | 49.9 | 349.2 | 23.9 F |
| 8 | 220 30.3 | 220 | 42.9 | 220 | 49.4 | 370.0 | 23.2 Fs |
| 9 | 225 30.0 | 225 | 42.4 | 225 | 48.8 | 392.0 | 22.5 G |
| 10 | 230 29.7 | 230 | 42.0 | 230 | 48.2 | 415.3 | 21.9 As |
| 11 | 235 29.3 | 235 | 41.5 | 235 | 47.7 | 440.0 | 21.2 A |
| 12 | 240 29.0 | 240 | 41.1 | 240 | 47.2 | 466.2 | 20.6 Bb |
| 13 | 245 28.7 | 245 | 40.7 | 245 | 46.7 | 493.9 | 20.0 H |
| 14 | 250 28.4 | 250 | 40.3 | 250 | 46.2 | 523.3 | 19.4 C |
| 15 | 255 28.1 | 255 | 39.9 | 255 | 45.8 | 554.4 | 18.8 Des |
| 16 | 260 27.8 | 260 | 39.5 | 260 | 45.3 | 587.3 | 18.3 D |
| 17 | 265 27.6 | 265 | 39.2 | 265 | 44.9 | 622.3 | 17.8 Es |
| 18 | 270 27.3 | 270 | 38.8 | 270 | 44.4 | 659.3 | 17.2 E |
| 19 | 275 27.1 | 275 | 38.4 | 275 | 44.0 | 698.5 | 16.7 F |
| 20 | 280 26.8 | 280 | 38.1 | 280 | 43.6 | 740.0 | 16.2 Fs |
| 21 | 285 26.6 | 285 | 37.8 | 285 | 43.2 | 784.0 | 15.7 G |
| 22 | 290 26.3 | 290 | 37.5 | 290 | 42.8 | 830.6 | 15.3 As |
| 23 | 295 26.1 | 295 | 37.1 | 295 | 42.5 | 880.0 | 14.8 A | table computed experimental value in the regression

SOUND/VIBRATION RESONANCE SEPARATING DEVICE

SOUND/VIBRATION RESONANCE SEPARATING DEVICE

THE TECHNICAL FIELD

This invention concerns equipment which separates vibration such as sound, music or noise in resonance. The equipment can immediately visualize many frequencies of vibration which are contained in sound. It detects a vibration ingredient into many frequency bands directly. The construction method of the equipment and the method of operation are explained in this document.

THE BACKGROUND TECHNOLOGY

"The cantilever" resonants with vibration, and it has been completed as a basic theory in physics and engineering. This equipment is used to apply this theory. It has many kinds of resonance vibrators such as 100–1300 Hz frequency which correspond to the human voice range. It separates human voice, music, noise and so on in the resonance directly, it can divide them into the vibration ingredients.

A computer can separate "sound" into frequency by computation of the Fourier transform. Also, it is possible to divide into every ingredient with the electronic circuit of the resonant circuit and the filter circuit, too. Then, it displays "sound" with a display and an indicator. However, it is a way of computation or with an electronic circuit.

With this invention, a person can feel vibration directly. This equipment separates "sound" and "vibration" real time into the frequency components and can show them directly. The effect of the separation is same as the effect in the hearing of a human being. It is possible to use as an auditory organ when changed into a digital signal. Since our life is surrounded by "sound" and "vibration," this equipment, which can see the state of the receiver of vibration directly, will be able to carry the field of indoor and educational activities in new directions.

The theory of the vibration resonator has been clarified in the field of physics and vibration engineering as vibration theory of the so-called "cantilever". As the theory states, I created and measured a vibration resonator which makes us able to see the phenomenon of sound frequency separation with our own eyes directly. It becomes a straight line in accordance with the theory when the relation between the length of piano wire and the actual measurement of the resonance vibration is analyzed by regression analysis and graphed. A piano wire is fixed on the rigid body and then the speaker of this equipment emits vibration and a resonance frequency is recorded. When this basic data is analyzed, relation to the resonance frequency of the oscillator according to the material and the length of the oscillator is computed by regression analysis.

The result is shown in FIG. 1. FIG. 1 is the computed data of (1) piano wire of 0.3 mm in diameter, (2) piano wire of 0.5 mm in diameter, (3) piano wire of 1.0 mm in diameter. Moreover, according to 0.3 mm piano wire, the frequency data of the scale of the pure temperament and the data of calculated results with the length of the oscillator to (4) from FIG. 1 is added. The piano wire used is JISG3522. Also, when the piano wire is changed into a stainless line of 0.008 mm in diameter, a resonance frequency of equal to or more than 1300 Hz can be measured. The actual measurement with the length of the resonance frequency and the oscillator is computated by regression computation.

THE ELUCIDATION OF THE INVENTION

For example, as a rigid body which conducts vibration to these oscillators, a stick of wood and resin is used. A straw can be used instead of wood is more simple construction. A hole to fix a piano wire on this rigid body in equal intervals is made. A piano wire is fixed to the holes with in turn the putting-in resin with length, making a vibration receiver.

Energy of sound with ordinary size Hz is not large enough to be resonant with this vibration reception resonator sufficiently. To vibrate an oscillator roughly, equipment which amplifies vibration to the vibration reception resonator is added. A sound is entered from microphone via the circuit to amplify and to control. Then, it is transmitted from the vibration equipment (the speaker) to the vibration reception resonator.

The sensitivity of the general vibration of the oscillator depends on the vibration band. As for low sound, resonance precision of the oscillator is high. For example, when the natural frequency of the 0.3 mm piano wire supposed to be 30 Hz, it vibrates in 1 Hz back and forth. However, at 400 Hz of the high-pitched tone, it vibrates more in the resonance in 5–10 Hz back and forth. When it is established that a spread of sensitivity of the resonance vibration changes depend on the vibration band, the resonant frequency is established. With low vibration, the oscillator resonants well and it vibrates roughly. The oscillator which reacts to the high vibration makes the length shortly. It becomes difficult to vibrate in the visualized level. Therefore, in high sound, it uses a thin oscillator with the amplitude of vibration which can be roughly seen.

THE SIMPLE EXPLANATION OF THE DRAWING

THE BEST FORM TO IMPLEMENT THIS INVENTION

Figure 2:
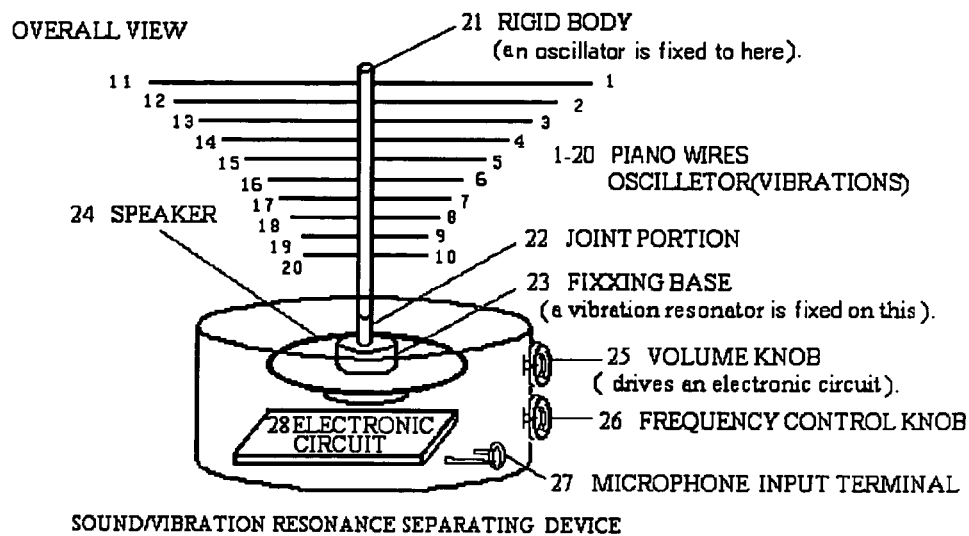
FIG. 2 is a solid figure of the main unit.

FIG. 2 is a solid figure of the main unit of the sound resonance separation equipment. It is an oscillator which has a wide range of principal vibration oscillators from (1) to (20). The vibration of the sound is converted from a microphone into electronic signals. When sound is entered into the microphone input terminal (27), the amplification is controlled by electronic circuit (28). Moreover, an electronic signal is output by vibration occurrence equipment (a speaker) (24). The vibration of sound becomes amplified vertical vibration and vibrates the vertical direction in the rigid body (21). The vibration spreads through oscillators (1)–(20) which have the principal vibration which is fixed on the rigid body. Then, only the oscillator vibrates according to the frequency of the vibration. There is a volume control

(25) to control the size of the vibration. Also, the frequency system control controls the transmission frequency of the sine wave.

Figure 3:
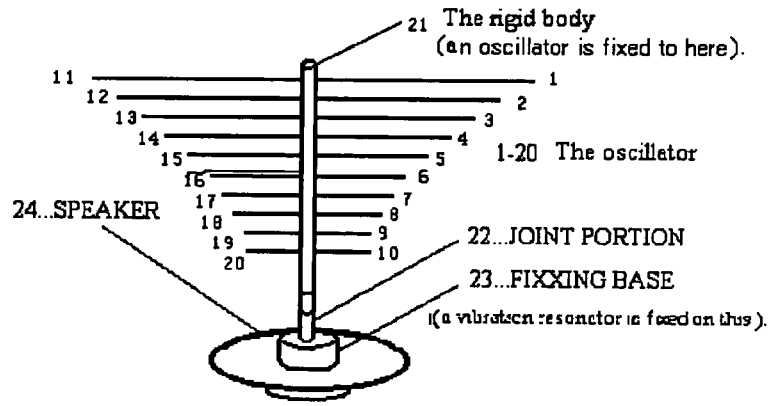
FIG. 3 is a solid figure of the vibration resonator which was joined at the speaker and the Fixation stand.

FIG. 3 is a solid figure of a resonance separator which was joined to the speaker which consists of more than one resonance oscillator. The natural frequency depends on Young's modulus, the cross-sectional area, the length and linear density of the material. For example, by using the value of the table of FIG. 1, it fixes 20 oscillators by every 10 Hz on rigid body (21) from 50 Hz to 250 Hz. The material of this rigid body (21) should be light and strong.

A vibration resonator is directly fixed to the center of the vibration of the speaker which is vibration occurrence equipment. The way of fixing is to glue together fixation stand (23) in the center of the vibration of the speaker. A load and the other power are devised to become small. The rigid body part of the vibration resonator is joined to the fixation stand (23) so as not to fall and not to become unattached by the vibration.

In the case of a large-sized oscillator which can be seen from a distance, it should hang from above so as not for the load of the oscillator to hang over the vibration occurrence equipment main unit such as a speaker. Moreover, the vibration main unit for the joint is more firmly glued together and fixed. Because this equipment is created to see the resonance vibration of sound, the volume must be suppressed. When using a speaker, it cuts off the part of the speaker corn.

Figure 4:
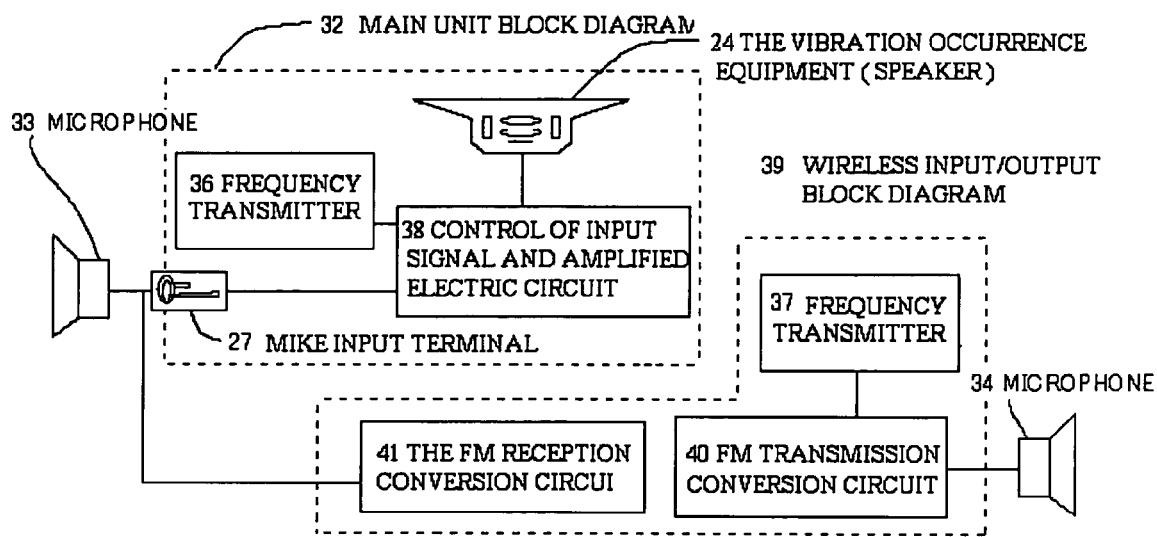
FIG. 4 is a block diagram of the electronic circuit.

FIG. 4 is a block diagram of the electronic circuit. The block (32) of the main unit which is surrounded by the dotted line is a figure which shows the electronic circuit (28) of FIG. 2 more specifically. In the block (39) which is a wireless input/output surrounded by the other dotted line describes the circuit of the FM transmitter (40) and the FM receiver (41) illustrated to enter sound from a long distance by considering the usage which is mentioned later.

For low vibration, oscillators vibrate well, but the width of the sensitivity is small. In bands of high sound, the width of the sensitivity of the resonance vibration is wide, but it is difficult to see the size of the movement of the oscillator by the naked eye. Therefore, the feature must be, as the situation demands, added to the control of the input signal and amplified electric circuit (38). To improve accuracy of the experiment, low frequency transmitters (36) and (37) for the sine curve output are added to the circuit. (However, the transmitter can be substituted for the outside system.) Voice input by microphone is (33) and (34).

Figure 5:
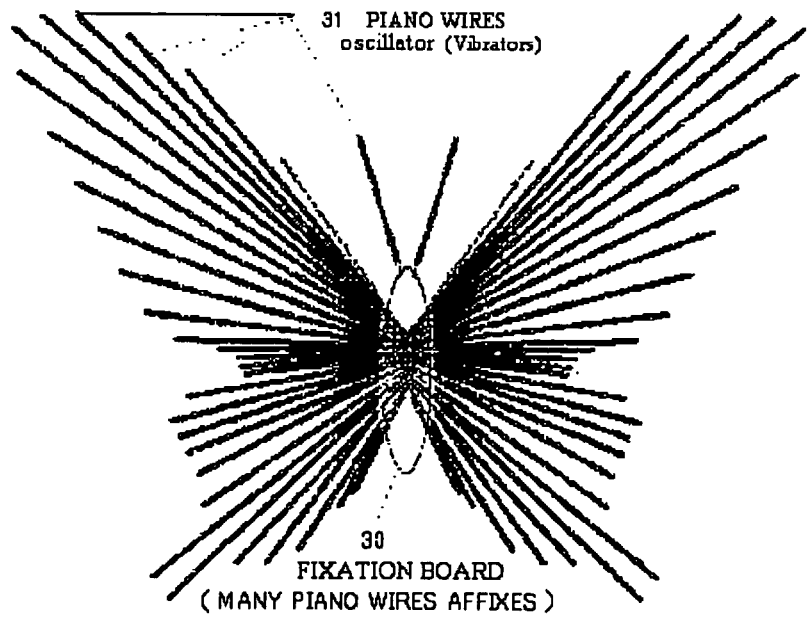
FIG. 5 is a different type of a oscillator which forms the shape of a black swallowtail butterfly as an example.
Figure 6:
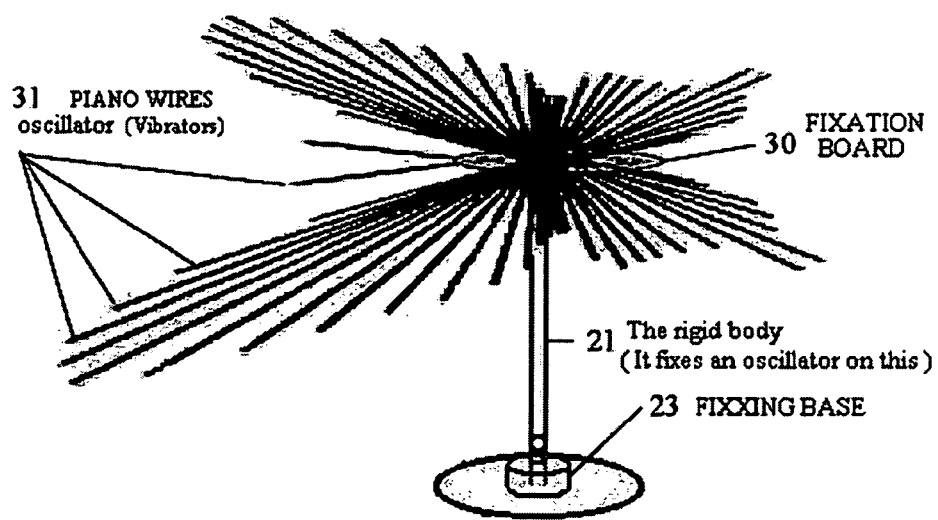
FIG. 6 is a solid figure that actually fixes the oscillator of FIG. 5.
Figure 7:
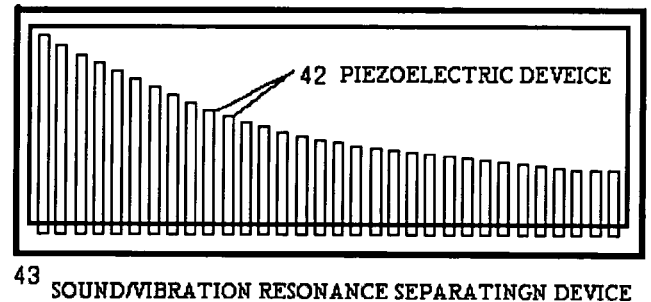
FIG. 7 is an example created with the piezoelectric device to change an oscillator into electronic signals.
Figure 8:
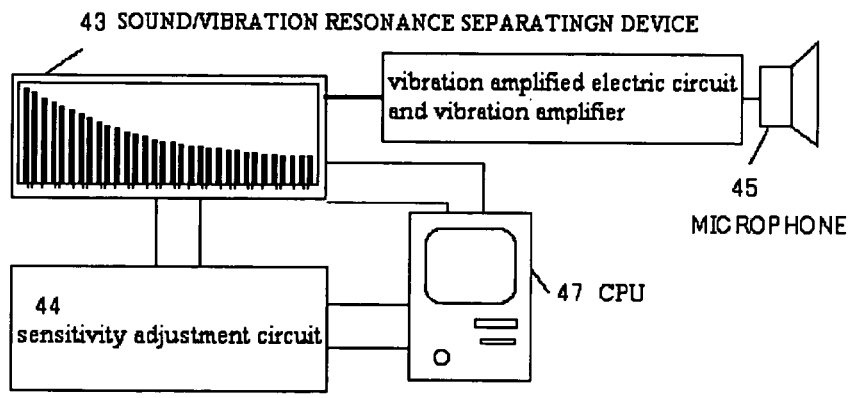
FIG. 8 is a block diagram of operation as the snail pipe of a artificial hearing receptacle.

FIG. 5 is a resonator which processed an oscillator for decorations. FIG. 6 is a solid figure of FIG. 5. FIG. 7 is an example of an oscillator created with the piezoelectric device. FIG. 8 is a block diagram of operation as the snail pipe of a artificial hearing receptacle.

AVAILABILITY IN THE INDUSTRY

The equipment of this invention divides the stimulation of various sounds into the ingredients of many frequency bands immediately. Then, the separated ingredients are able to be seen simultaneously. It has the effect as specified below.

(1) The physical field—teaching materials for learning about "wave motion"

(2) The field of biology—teaching materials for learning about the "auditory system"

(3) The mathematics field—As an actual model of the Fourier transform (4) The children's education field As a toy which reacts to the sound and the voice which the child can emit personally (5) The education of handicapped children field As introduction equipment for a person who has damage to hearing and vocalizing organs to understand an auditory organ and to practice vocalizing (6) The sound field As an attachment to audio equipment to enjoy by seeing the reaction of sound. Moreover, by the device which sends the signal of the sound from the distant place by the FM electric wave, the above-mentioned effect can be improved.

The invention claimed is:

1. A vibration resonator comprising:
   a rigid body; and
   an oscillator affixed thereto, the oscillator comprising a plurality of elastic bodies; the elastic bodies comprising resonant strands;
   wherein vibration conducted to said oscillator by said rigid body is separated into frequency components by said resonant strands.

2. A sound/vibration resonance separating device comprising
   a circuit for converting sound, into an electronic signal, said circuit including an amplifier and a frequency control to amplify a specific frequency band of said signal and to control and to adjust it;
   a speaker for converting said signal into a sound signal; and
   a rigid body which conducts vibrations from said signal from said speaker; an oscillator affixed to said rigid body, the oscillator including a plurality of strands, wherein each strand resonates in response to a particular frequency component in said vibration conducted by said rigid body so that said vibration is separated into frequency components;
   wherein said strands are sized so that resonation of at least some of the strands is readily observable to observers without additional instrumentation.

3. A frequency component detector comprising: of a vibration resonator; and
   an electronic circuit
   wherein the vibration resonator comprises a rigid body and an oscillator affixed thereto, the oscillator comprising a plurality of resonant strands;
   wherein the vibration resonator separates vibrations into frequency components by said resonant strands; and
   wherein the electronic circuit vibration from each resonant strand into an electronic signal and adjusts and controls the signal.

* * * * *